May 9, 1939.   D. H. STOREY   2,157,681
TRAILER HITCH
Filed Nov. 25, 1938
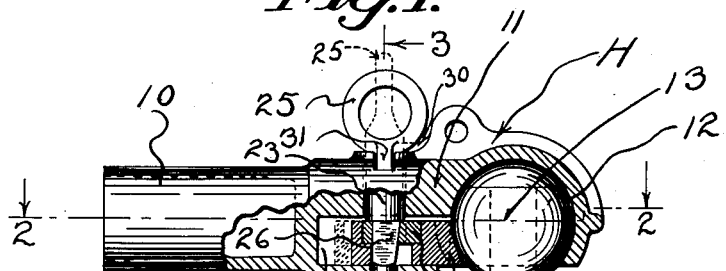
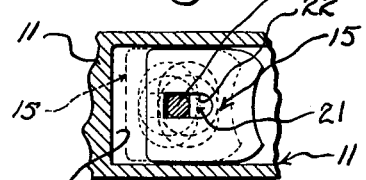
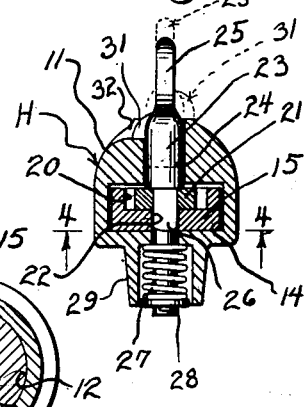
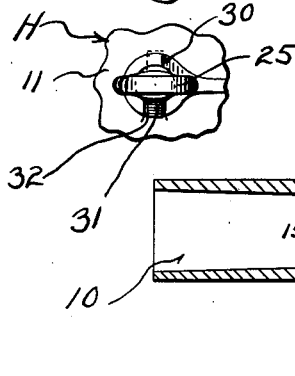
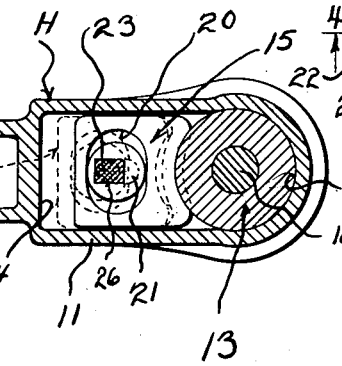
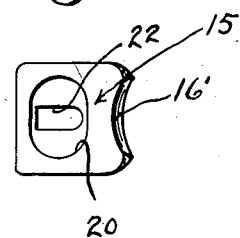
Inventor
D. H. Storey
By
Attorneys Patented May 9, 1939

2,157,681

UNITED STATES PATENT OFFICE 2,157,681

TRAILER HITCH

Daniel H. Storey, Wausau, Wis.

Application November 25, 1938, Serial No. 242,207

2 Claims. (Cl. 280—33.15)

This invention appertains to ball hitches for connecting a trailer to a pulling vehicle, such as an automobile.

One of the primary objects of my invention is to provide novel means for detachably mounting the ball in the socket, whereby accidental displacement thereof is reduced to a minimum, and whereby direct pull will be had on a solid part of the socket.

Another salient object of my invention is to provide means for constructing the socket whereby the ball can be quickly and easily connected therewith or removed therefrom, without the employance of tools.

A further important object of my invention is the provision of a socket for receiving the ball, having a slide plate for holding the ball in the socket, with novel means for manually actuating the plate, the plate being normally held against movement.

A still further object of my invention is to provide a ball and socket hitch of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a side elevational view of my hitch, parts of the view being shown broken away and in section to illustrate structural details.

Figure 2 is a longitudinal sectional view through the hitch, the view being taken on the line 2—2 of Figure 1, looking in the direction of the arrows.

Figure 3 is a transverse, sectional view through the hitch, the view being taken on the line 3—3 of Figure 1, looking in the direction of the arrows, illustrating the means for actuating the slide plate.

Figure 4 is a fragmentary, longitudinal, sectional view taken on the line 4—4 of Figure 3, looking in the direction of the arrows, showing the bottom face of the slide plate.

Figure 5 is a detail, top, plan view of the slide plate.

Figure 6 is a fragmentary, top, plan view of the hitch, showing the handle for actuating the slide plate.

Referring to the drawing in detail, wherein similar reference characters designate corresponding parts throughout the several views, the letter H generally indicates my novel hitch, and the same includes an attaching shank 10, which is adapted to be rigidly secured to the tongue or similar part of a trailer (not shown).

The forward end of the shank 10 has formed thereon a head 11, and this head has formed therein a semispherical socket 12 for the reception of the ball 13. The head 11 in rear of the socket has formed therein a chamber or compartment 14 for slidably receiving the slide plate 15. The compartment or chamber 14 opens into the socket 12, and it is to be noted that the forward end of the slide plate is curved, as at 16', to conform to the curvature of the socket 12, and so as to snugly engage the ball 13. When the slide plate is in its projected position, as shown in full lines in Figure 1, the socket is slightly greater than a semisphere. Thus, the ball is firmly held in the socket against accidental displacement, but, obviously, the socket is free to turn on the ball.

The ball 13 can be of any preferred construction, and is provided with a flange 16 for engaging the top of a drawbar 17, shown in dotted lines in Figure 1. The ball also carries a depending bolt shank 18, which is extended through the drawbar, and the bolt can be held against displacement by the use of suitable nuts 19.

Particular stress is laid on the construction of the slide plate 15, as the same forms an important part of my invention. Thus, the slide plate has formed in its upper surface a cavity 20, and snugly mounted within the cavity is a cam or eccentric disc 21. Communicating with the cavity 20 is a longitudinally extending slot 22.

An operating rod 23 is slidably and rotatably mounted in the head 11 of the hitch, and, hence, the head is provided with a vertically disposed bore 24 for receiving the rod, and this bore extends through the chamber 14 and opens out through the upper and lower faces of the hitch. The upper end of the rod 23 is provided with any preferred type of manipulating handle 25, and in the present instance the same has been shown to be in the form of a finger-engaging ring. Intermediate its ends, the operating rod 23 is provided with a polygonal portion 26, and the cam or eccentric disc 21 is mounted upon this portion of the rod, so that upon turning movement of the rod the cam or eccentric will be rotated therewith. The polygonal portion 26 of the rod is formed relatively long, and when the rod is in its lowered position, as shown in full lines in Figures 2 and 3, the squared portion also extends in the slot 22 of the slide plate 15. As the side walls of the slot 22 engage opposite faces of the rod, accidental turning movement of the rod is prevented when the rod is in its lowered position.

In order to maintain the rod in its lowered position against accidental movement, an expansion spring 27 is coiled around the lower end of the rod 23, and one end of the spring bears against the lower face of the hitch, and the other end of the hitch against a washer 28 carried by the rod. If preferred, the head of the hitch can have cast thereon a sleeve 29 for surrounding the spring to form a protecting housing therefor.

In operation of my hitch, when it is desired to disconnect the socket portion from the ball 13, the rod 23 is pulled upward by the ring 25 against the tension of the spring 27, and the squared portion of the rod will ride out of the slot 22, which will permit the turning of the rod. Upon the turning of the rod, the cam or eccentric 21 will engage the walls of the cavity 20 and push back the slide plate 15 away from under the ball 13. Hence, the socket can be lifted off the ball. In order to limit the turning movement of the rod, the head 11 of the hitch is provided with a stop 30, which is arranged in the path of a finger 31, which is formed on the rod and extends radially therefrom. When the rod is in its lowered position the finger 31 rides in a slot 32 formed at the head of the hitch.

To re-connect the ball 13 with the socket, it is merely necessary to replace the ball within the socket and then turn the rod 23 in a counter-clockwise direction until the finger 31 reaches the slot 32. The cam 21 will project the slide plate 15 under the ball 13, and when the finger 31 reaches the slot 32, the spring 27 will pull down on the rod, and all of the parts will be firmly held against accidental movement.

It is to be noted that the forward face of the polygonal portion 26 of the rod 23 is inclined downwardly, and, hence, as the rod is pulled down by its spring, the inclined face has a tendency to push the cam 21 and plate 15 forward. This assures the proper engagement of the plate with the ball.

From the foregoing description it can be seen that I have provided an exceptionally simple and durable form of ball and socket hitch in which the parts can be readily connected and disconnected without danger of accidental displacement.

Changes in details may be made without departing from the spirit or the scope of this invention, but what I claim as new is:

1. In a trailer hitch, a shank, a head carried by the forward end of the shank provided with a socket and a chamber communicating with the socket, a slide plate mounted within the chamber and movable into and out of the socket, said slide plate having a cavity and a slot communicating with the cavity, an operating rod rotatably and slidably mounted on the head having a squared portion formed thereon intermediate its ends normally mounted in the slot, an eccentric mounted on the squared portion of the rod fitted in said cavity for turning movement with the rod, spring means normally holding the rod in a lowered position, with a part of the squared portion of the rod in the slot, and a handle for turning and lifting the rod.

2. In a trailer hitch, a shank, a head carried by the forward end of the shank provided with a socket and a chamber communicating with the socket, a slide plate mounted within the chamber and movable into and out of the socket, said slide plate having a cavity and a slot communicating with the cavity, an operating rod rotatably and slidably mounted on the head having a squared portion formed thereon intermediate its ends normally mounted in the slot, an eccentric mounted on the squared portion of the rod fitted in said cavity for turning movement with the rod, spring means normally holding the rod in a lowered position, with a part of the squared portion of the rod in the slot, a handle for turning and lifting the rod, and means for preventing accidental rotation of the rod.

DANIEL H. STOREY.